(12) United States Patent
Fuhrman et al.

(10) Patent No.: US 8,661,627 B2
(45) Date of Patent: Mar. 4, 2014

(54) MAGNETIC JEWELRY CLASP WITH CATCH

(75) Inventors: Robert Fuhrman, Weehawken, NJ (US); Esther Fuhrman, Weehawken, NJ (US)

(73) Assignee: EF Designs, Ltd., Weehawken, NJ (US)

( * ) Notice: Subject to any disclaimer, the term of this patent is extended or adjusted under 35 U.S.C. 154(b) by 0 days.

(21) Appl. No.: 13/385,124

(22) Filed: Feb. 3, 2012

(65) Prior Publication Data
US 2013/0139360 A1    Jun. 6, 2013

Related U.S. Application Data

(62) Division of application No. 12/069,413, filed on Feb. 11, 2008, now Pat. No. 8,209,824.

(51) Int. Cl.
*A44C 11/02* (2006.01)
(52) U.S. Cl.
USPC .......................................................... 24/303
(58) Field of Classification Search
None
See application file for complete search history.

(56) References Cited

U.S. PATENT DOCUMENTS

| | | | | |
|---|---|---|---|---|
| 2,654,929 | A * | 10/1953 | Feibelman | 24/303 |
| 5,008,984 | A * | 4/1991 | Levy | 24/303 |
| 6,591,462 | B2 * | 7/2003 | Fuhrman | 24/303 |

* cited by examiner

*Primary Examiner* — Jack W. Lavinder
(74) *Attorney, Agent, or Firm* — Stephen E. Feldman; Feldman Law Group, P.C.

(57) ABSTRACT

A magnetic jewelry clasp is described that includes a first body member having a magnet that defines a first magnetically attractive surface. The clasp includes a second body member that has a magnet that defines a second magnetically attractive surface that magnetically connects to the first magnetically attractive surface to define a first locking arrangement of the clasp. The clasp includes a safety catch that has a first protuberance that is adapted to open and close the safety catch. The safety catch includes a second protuberance that fits over the end of the second body member which defines a second locking arrangement of the clasp. The Safety catch is designed so that it will function whether the two bodies are brought together with both right side up or with one up side down. It includes a pair of side panels that prevent misalignment of the first and second body members.

20 Claims, 13 Drawing Sheets

MAGNETIC JEWELRY CLASP WITH CATCH

RELATED APPLICATIONS

This a divisional application of U.S. application Ser. No. 12/069,413, filed on Feb. 11, 2008.

FIELD OF THE INVENTION

The present invention relates to jewelry and, more particularly, to magnetic jewelry clasps.

DESCRIPTION OF RELATED ART

Fastening and unfastening necklaces behind the neck with conventional jewelry clasps is extremely difficult for most women, particularly older women and arthritis sufferers. Even younger women with good finger dexterity are unable to fasten most bracelet clasps without help, because often the clasp must be fastened with one free hand.

Magnetic clasps have been introduced that are much easier to fasten and unfasten. However, magnetic clasps can open and the jewelry item lost, especially if the jewelry item gets caught on something or the magnets are attracted to iron or steel objects. For this reason magnetic clasps with safety catches have been introduced. Available magnetic clasps with safety catches are relatively difficult to open and close. The magnetic interlocking arrangement is often, not very secure. In addition some are simply not attractive and therefore not very suitable for an ornamental item such as jewelry.

Therefore, there is need for an improved magnetic clasp with an improved safety catch. The clasp should be easy for the wearer to open and close, yet secure and attractive.

SUMMARY OF THE INVENTION

A magnetic jewelry clasp is described that comprises a first body member and a second body member that are magnetically connected to each other. The clasp includes a safety catch that is movable from an unlatched position to a latched position to prevent separation of the first and second body members in their locked position. The catch can be either magnetic or mechanical.

The first body member defines a first open end and a first closed end. The first body member includes a first magnet that has a north pole and south pole that are respectively flush with the first closed end and first open end. The first open end defines a first magnetically attractive surface.

The second body member defines a second open end portion and a second closed end portion. The second body member includes a second magnet that has a north pole and south pole that are respectively flush with the second open end and second closed end. The second open end defines a second magnetically attractive surface, with the pole on the open end (either North or South) different from the pole on the open end of the first body.

The safety catch has a hinged end that is pivotally affixed to the first closed end of the first body member. The safety catch has a free end that includes a first protuberance and a second protuberance that respectively extend up and down from the free end. The first protuberance is adapted to facilitate opening and closing the clasp with at least one finger of a user while moving the catch between the open and closed positions with a finger. The second protuberance helps to hold the two bodies securely together. In some embodiments the catch may include a pair of side panels that preferably extend downward from the catch.

The first magnetically attractive surface defined by the first body member and second magnetically attractive surface defined by the second body member magnetically attach to each other and define a first locking arrangement of the clasp. The second protuberance reaching down the closed end of the second body provides a second locking mechanism. In some embodiments the safety catch arm is or includes a magnet or magnets providing a third locking mechanism. The side panels defined by the catch in some embodiments prevent misalignment of the first and second body members away from the central axis.

BRIEF DESCRIPTION OF DRAWINGS

The above mentioned and other features, aspects and advantages of the present invention will become better understood with regard to following description, appended claims and accompanying drawings, wherein like reference numerals refer to similar parts throughout the several views where:

Figure 1:
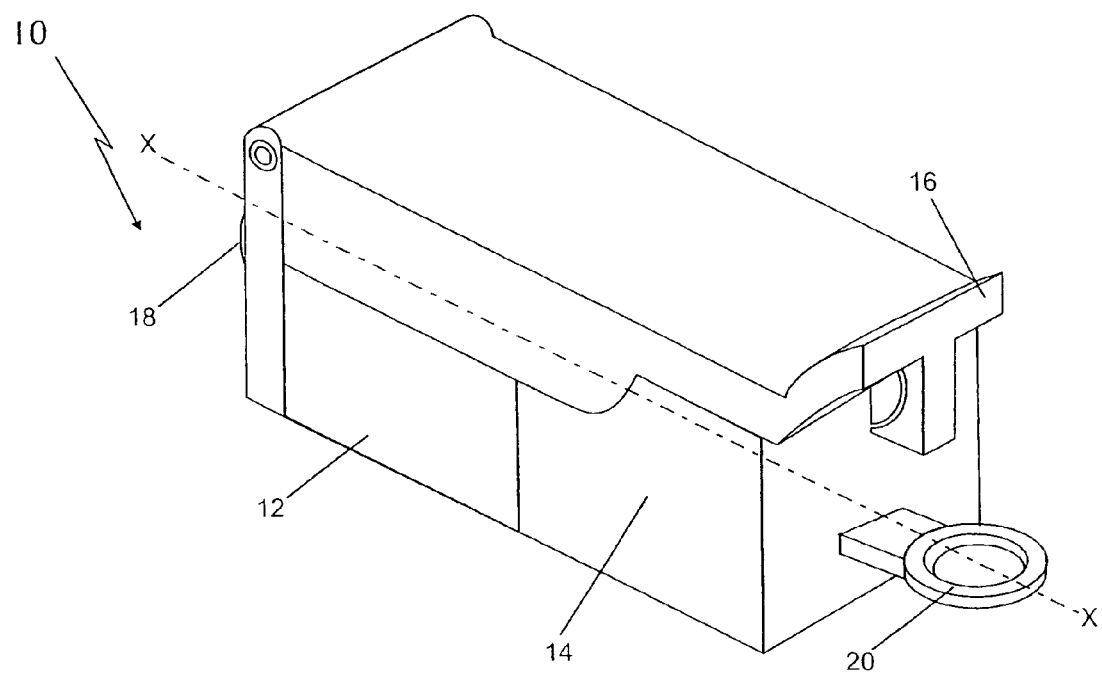
FIG. 1 is a perspective view of a jewelry clasp constructed in accordance with the present invention.

DESCRIPTION OF THE PREFERRED
EMBODIMENT OF THE INVENTION

Although specific terms are used in the following description for sake of clarity, these terms are intended to refer only to particular structures of the invention selected for illustration in the drawings, and are not intended to define or limit the scope of the invention.

Figure 2:
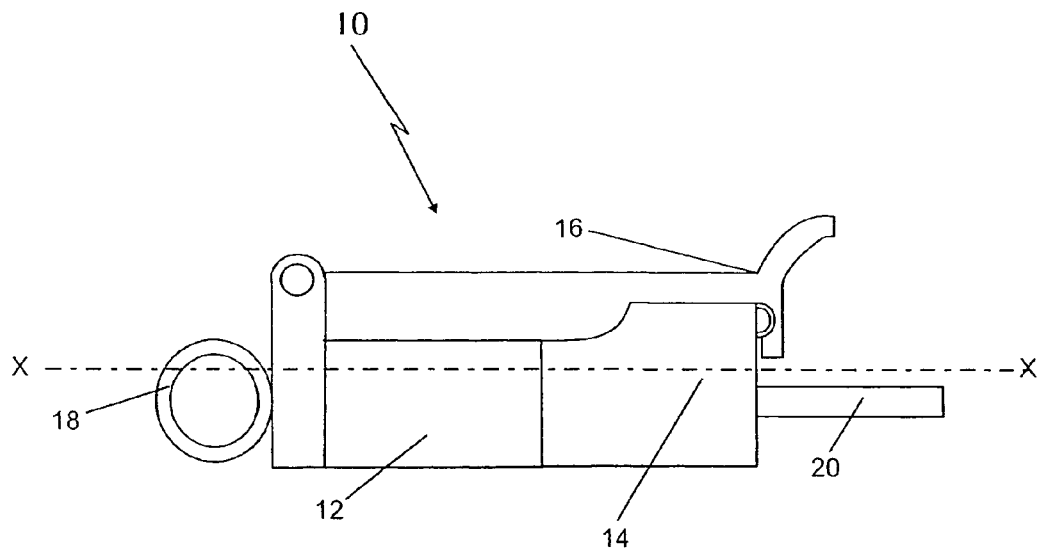
FIG. 2 is a side view of the jewelry clasp of FIG. 1.

Referring initially to FIGS. 1 and 2, a jewelry clasp 10 is shown that includes a first body member 12 and a second body member, 14 that are configured to be aligned along a central transverse X-axis. The clasp 10 includes a safety catch 16 that is preferably hingedly attached to the first body member 12 to substantially lock the first body member 12 with the second body member 14. The first body member 12, second body member 14 and safety catch 16 are preferably made of materials of high strength and resiliency such as stainless steel, preferably feritic stainless steel, or other magnetic stainless steel. These materials will enhance the magnetic attraction of magnets 28 and 50. It is understood, however, that the material of construction of body members 12, 14 can vary as per the intended use of clasp 10 and can be made of ornamental and precious materials such as gold, silver or platinum. The clasp can also include precious stones, such as diamonds, rubies or emeralds; or other ornamental materials such as glass crystals.

First body member 12 and second body member 14 have their lateral distal ends respectively connected to rings 18, 20. The rings 18, 20 are preferably adapted to affix clasp 10 to a free end of a jewelry article such as, for example, a chain, a necklace, a bracelet and an anklet. The rings 18 and 20 in this one preferred embodiment are connected to bodies 12 and 14 and clasp 10 using conventional methods such as, but not limited to, soldering and crimping. The rings 18 and 20 in this one embodiment are of circular shape, however, it is understood that the rings 16 can be of any shape, such as oval, rectangular, and elliptical, for example. The rings can also be eliminated and the clasp built in to jewelry items, such as necklaces and bracelets by the manufacturer.

Figure 3:
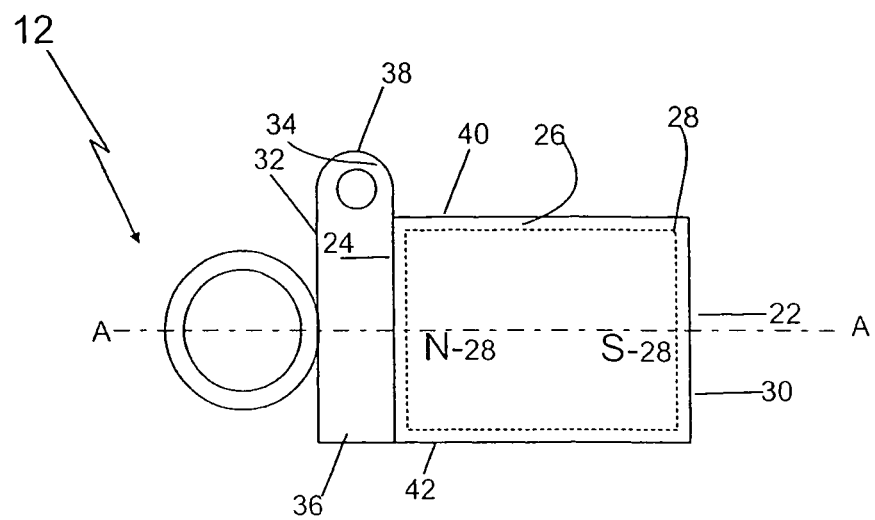
FIG. 3 is a side view of a first body member of the clasp of FIG. 1.
Figure 4:
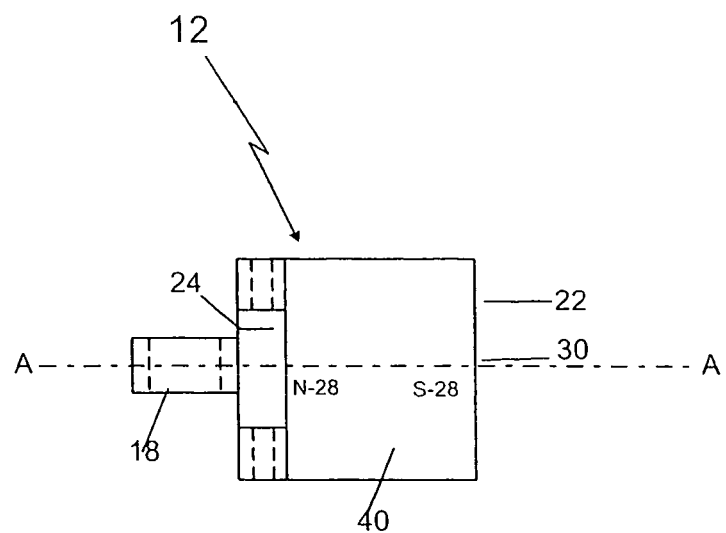
FIG. 4 is a top view of the first body member of the clasp of FIG. 1.

First body member 12 is bilaterally disposed along a central axis-A that is preferably adapted to be substantially aligned with the central transverse X-axis referring to FIGS. 3 and 4. First body member 12 has a first open end portion 22 and a first closed end portion 24. The first open end portion 22 defines a cavity or recess 26 within the first body member 12 that is preferably adapted to accommodate a magnet 28. Magnet 28 is adhesively secured into recess 26. However, it is understood that magnet 28 can be secured within recess 26 using alternative techniques such as, for example, crimping and laser soldering. Magnet 28, in this one preferred embodiment, is preferably made of permanent magnetic material such as Sintered Neodymium Iron Boron (NdFeB) N50, although it is understood that magnet 28 can be also made of permanent magnetic materials such as, for example, Samarium cobalt, Alnico Ceramic, and Ferrite. The magnet 28 positions within recess 26 such that a North Pole N-28 remains within recess 26 and South Pole S-28 substantially flushes or aligns with first open end portion 22 to define a first magnetically attractive surface 30.

The first closed end portion 24 includes a post 32 that has an upper end 34 and a lower end 36. The upper end 32 defines a hinge portion 38 that that is preferably adapted to receive a hinged pin defined by the safety catch 16. The upper end 34 is of semicircular shape and the lower end 34 is substantially flat, although, it is understood that their shapes may vary in other alternative embodiments of clasp 10. First body member has a flat top surface 40 and a flat bottom surface 42 that define a height that, in the preferred embodiment is somewhat shorter than the length of the first body member 12. In this one preferred embodiment, the length and width of the first body member 12 are approximately equal to each other, although, it is understood the width and length may vary in other alternative embodiments. Post 32 has a height that is relatively greater than the height of the first body member 12 so as to allow catch 16 to be comfortably attached to upper end 34.

Figure 5:
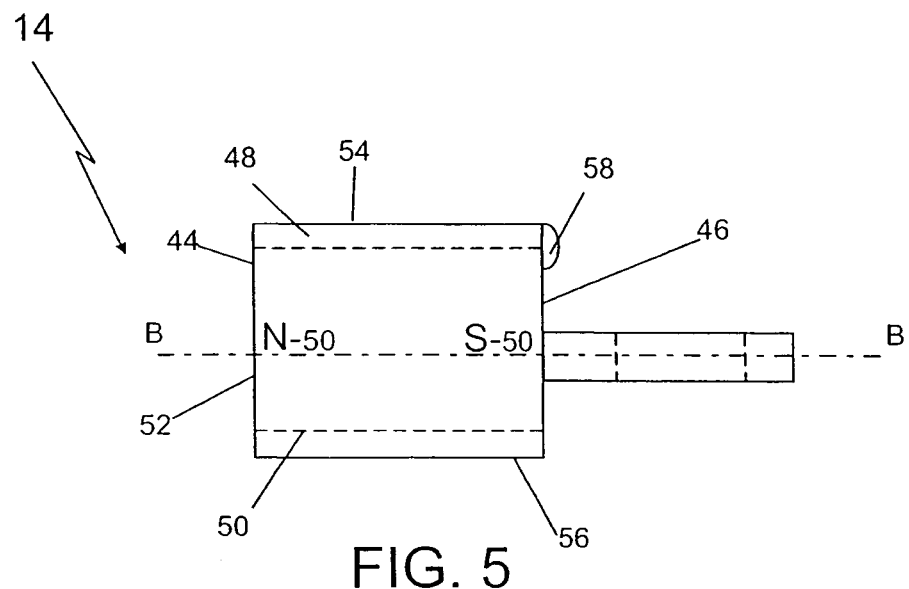
FIG. 5 is a side view of a second body member of the clasp of FIG. 1.
Figure 6:
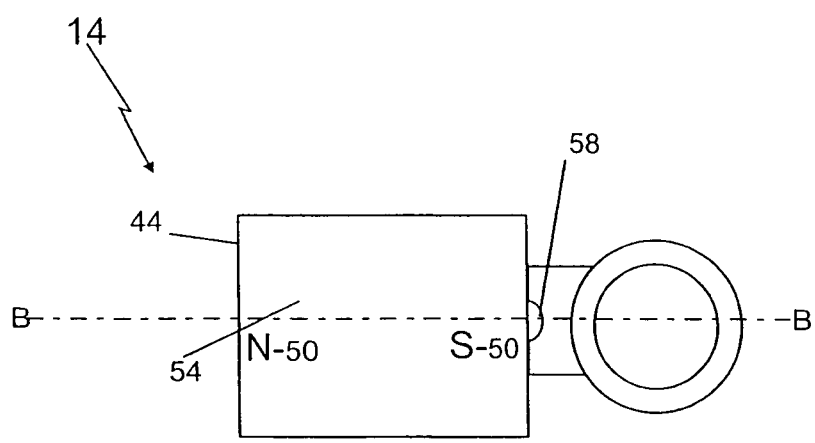
FIG. 6 is a top view of the second body member of the clasp of FIG. 1.

Referring to FIGS. 5 and 6, second body member 14 is bilaterally disposed along a central axis-B that is preferably adapted to be substantially aligned with the central transverse X-axis. Second body member 14 has a second open end portion 44 and a second closed end portion 46. The second open end portion 44 defines a cavity or recess 48 within the first body member 12 that is preferably adapted to accommodate a magnet 50. Magnet 50 is adhesively secured into recess 48, however, it is understood that magnet 50 can be secured within recess 48 using alternative techniques such as, for example, crimping or laser soldering. Magnet 50, in this one preferred embodiment, is preferably made of permanent magnetic material such as Sintered Neodymium Iron Boron (NdFeB) N50, however it is understood that magnet 50 can be also made of permanent magnetic materials such as, for example, Samarium cobalt, Alnico Ceramic, and Ferrite. The magnet 50 positions within recess 48 such that a South Pole S-50 remains within recess 48 and North Pole N-50 substantially flushes or aligns with second open end portion 44 to define a second magnetically attractive surface 52.

The second body-member 14 has a fiat top surface 54 and a flat bottom surface 56 that define a height that is somewhat less than the length defined by the second body member 14. In this one preferred embodiment, the length and width of the second body member 14 are approximately equal to each other, however, it is understood that the width and length may vary in other alternative embodiments.

In one embodiment, the second closed end portion 46 of the second body member 14 includes a bump 58 that protrudes from second closed end portion 46 and is preferably aligned along top surface 54. In this one embodiment, bump 58 is preferably of hemispherical shape, however, it is understood that the shape of bump 58 may vary in other alternative embodiments. Bump 58 is made by either being pressed out of the second closed end portion or permanently affixed to second closed end portion 46 using joining techniques such as, for example, welding or soldering.

Figure 7:
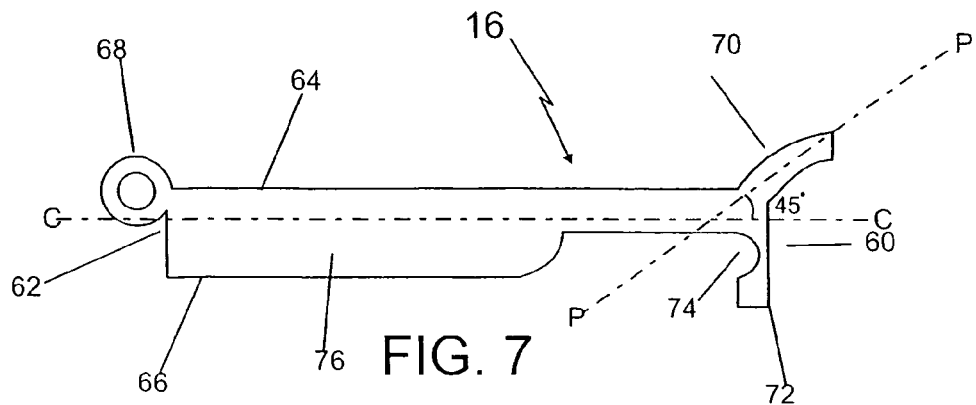
FIG. 7 is a side view of a safety catch of the clasp of FIG. 1.
Figure 8:
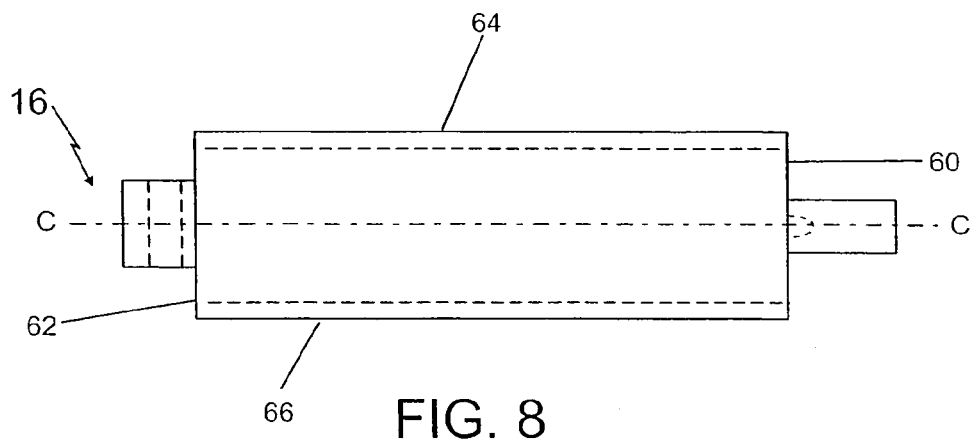
FIG. 8 is a top view of the safety catch of the clasp of FIG. 1.

Referring to FIGS. 7 and 8, safety catch 16 includes a free end 60 and a hinged end 62. Safety catch 16 is bilaterally disposed along a central axis-C that is preferably adapted to be substantially aligned with the central transverse axis-X. The catch 16 has a top surface 64 and a bottom edge of the side panel 66 that define a width of the catch that is approximately half the width defined by the first body member 12 and second body member 14. The hinged end 62 includes a hinged ring 68 that is preferably adapted to be connected to hinge portion 38 (Refer FIGS. 2 and 3) of first body member 12 (Refer FIGS. 2 and 3).

The free end 60 includes a first protuberance 70 that preferably protrudes along an axis-P at a preferred angle of approximately 45° from the central axis-C. The free end 70 is adapted to be either pushed down or pulled up with a finger to be grasped by at least two fingers of the user's hand. The free end 60 includes a second protuberance 72 that protrudes from the central axis-C. The second protuberance 72, in some embodiments, includes an indentation 74 that has a configuration to be engaged with bump 58 defined by second body member 14. First protuberance 70 and second protuberance 72 are approximately the same length, in the embodiment illustrated, although, it is understood that their length may vary in other alternative embodiments.

Top surface 64 is substantially flat and parallel to the central axis-C. Bottom surface 66 defines a pair of side panels 76 that preferably downwardly extend from central axis-C. The side panels 76 are substantially perpendicular the hinged end 62 and preferably decrease in their width up to free end 60. The side panels 76 are preferably adapted to prevent misalignment of the body members 12, 14 along the sideways from the central axis-X. The side panels stay by a closer fit to the second body members, so that a clicking sound is formed when the clasp is closed to indicate that it is closed.

Figure 9:
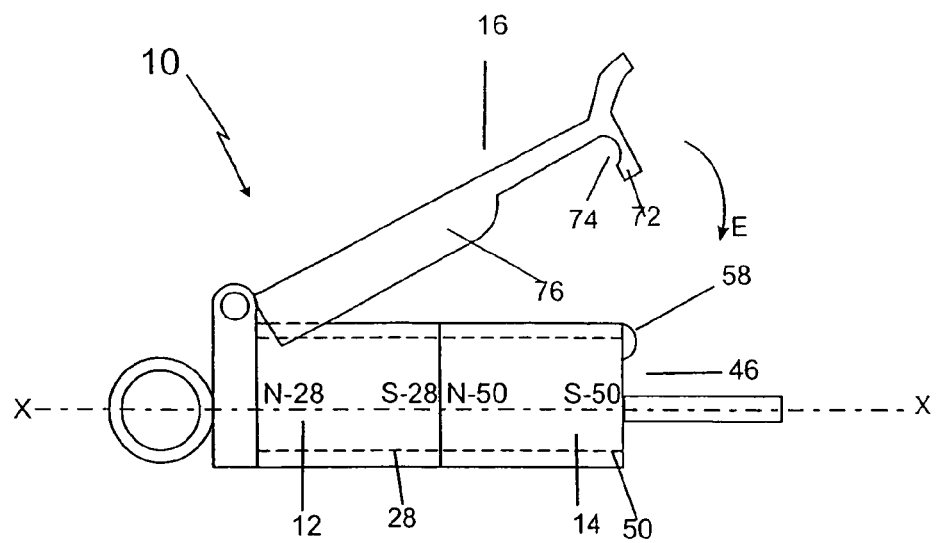
FIG. 9 is a side view of the clasp of FIG. 1 that shows the use of the safety catch.

Referring to FIG. 9, axis-A of first body member 12 (Refer FIGS. 3 and 4) and axis-B of second body member 14 (Refer FIGS. 5 and 6), in use, substantially align along the central transverse axis-X while connecting first body member 12 to second body member 14. The alignment of axes B and C along the central axis-X preferably allows South Pole S-28 of magnet 28 of first body member 12 to readily align and engage with North Pole N-50 magnet 50 of second body member 14. This allows first magnetically attractive surface 30 (Refer FIG. 3) to be connected with second magnetically attractive surface 52 to define a first locking arrangement of the clasp 10. In this position, first top surface 40 of first body member 12 (Refer FIG. 3) substantially aligns with second top surface 54 of second body member 14 (Refer FIG. 5). In this position, second bottom surface 42 of first body member 12 (Refer FIG. 3) substantially aligns with second bottom surface 56 of second body member 14 (Refer FIG. 3).

Referring again to FIG. 9, safety catch 16, in use, is moved from the unlatched position to the latched position in the direction shown by arrow-E. In the latched position, bottom surface 66 of safety catch 16 (Refer FIG. 7) preferably aligns with top surfaces 40 and 54 of first body member 12 and second body member 14. This allows second protuberance 72 to comfortably gasp second closed end portion 46 of second body member 14. In use on a piece of jewelry such as a bracelet when the magnets 28 and 50 are brought close to-each other their attraction will cause contact and at the same time the magnetic attraction of the magnets to the underside if the latch is at least slightly one the vertical position 73 of latch 16 will move the latch into the latched position.

In addition, side panels 76 surround first body member 12 and second body member 14 to advantageously avoid misalignment between bodies 12 and 14 and also prevent clasp 10 from being moved or pushed sideways from the central longitudinal axis-X. This defines a second locking arrangement of the clasp 10.

Indentation 74 defined by second protuberance 72 preferably snap-fits with bump 58 defined on second body member 14. This facilitates catch 16 to lock second body member 14 with first body member 12 to provide an additional locking security. This defines a third locking arrangement of the clasp 10.

Figure 10:
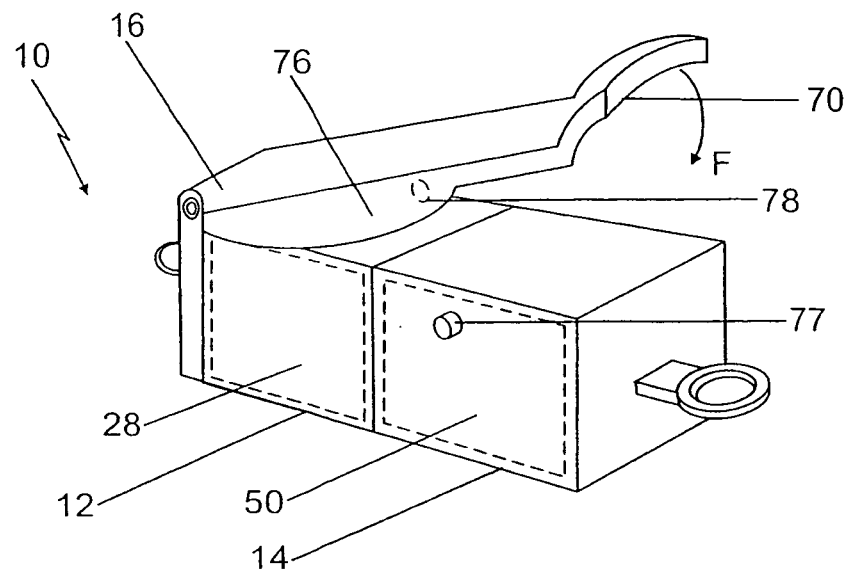
FIG. 10 is a perspective view of an alternative embodiment of the clasp of FIG. 1.
Figure 11:
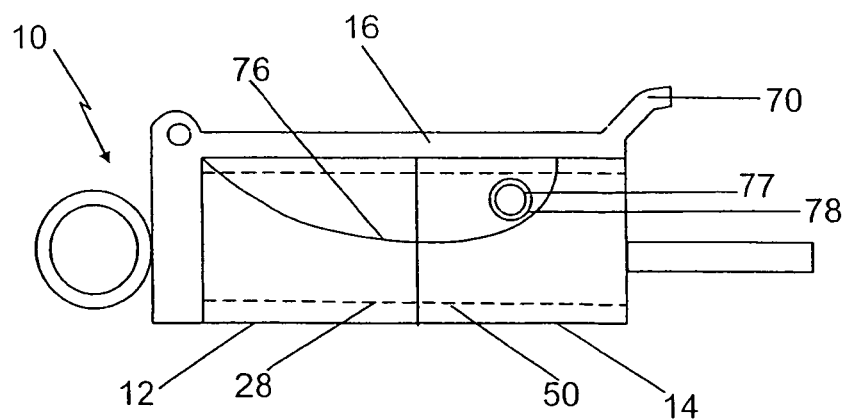
FIG. 11 is a side view of the alternative embodiment of the clasp of FIG. 10.
Figure 12:
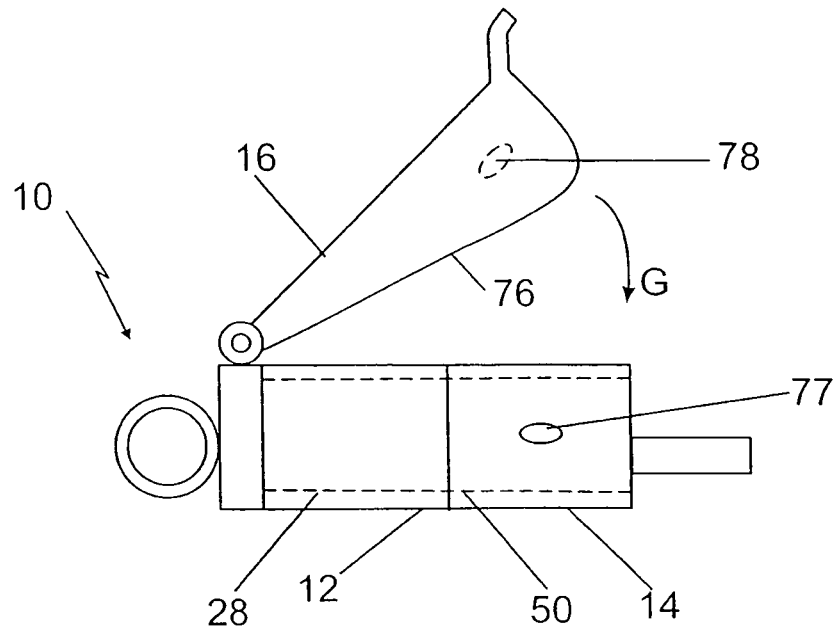
FIG. 12 is a side view of an alternative embodiment of the clasp of FIG. 1 before positioning the catch to the clasp end.
Figure 13:
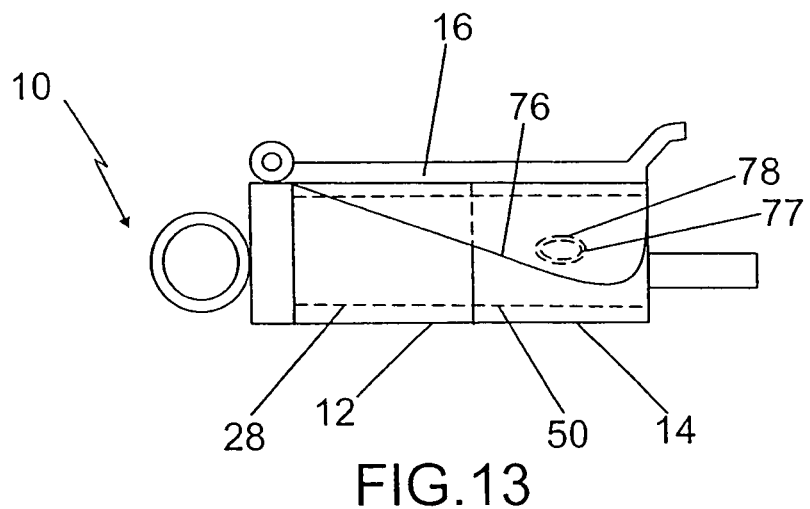
FIG. 13 is a side view of the clasp of FIG. 12 after positioning the catch to the clasp end.
Figure 14:
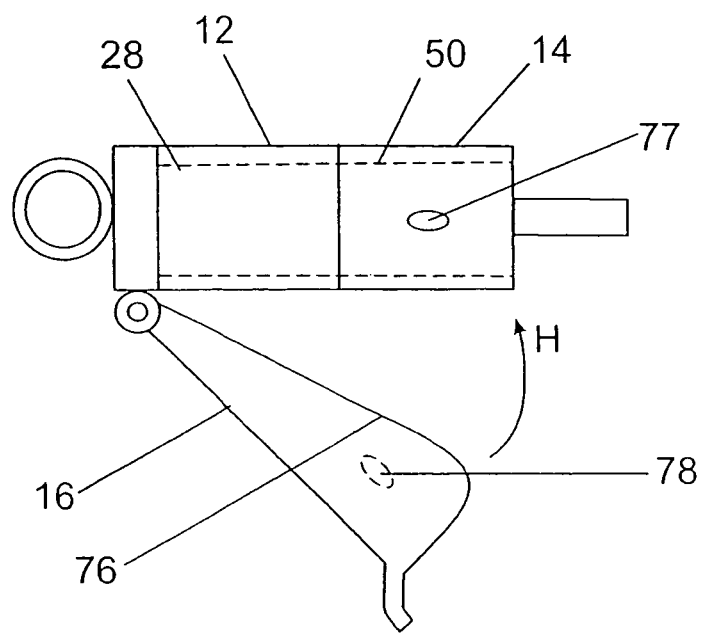
FIG. 14 is a side view of the clasp of FIG. 12 with an alternative position of the catch.
Figure 15:
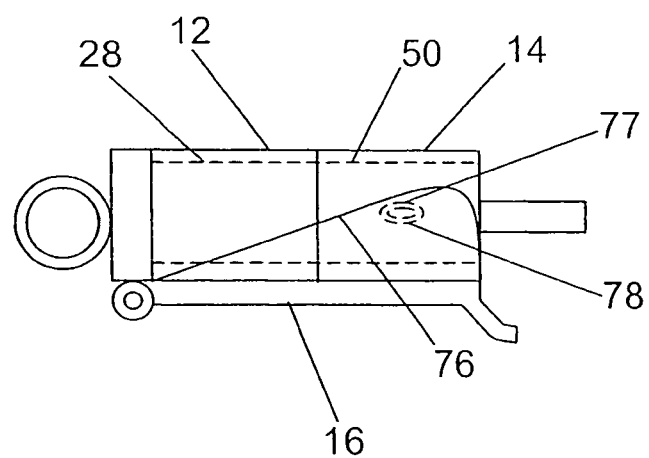
FIG. 15 is a side view of the clasp of FIG. 14 after positioning the catch to the clasp end.

Referring to FIGS. 10 and 11, an alternative embodiment of clasp 10 is shown wherein the catch 16 includes only first protuberance 70 and the second protuberance 72 (Refer FIG. 9) is eliminated. In this alternative embodiment, magnets 28, 50 of body members 12, 14 magnetically lock over each other to define the first locking arrangement of the clasp 10. In addition, side panels 76 embrace body members 12, 14 to define the second locking arrangement of the clasp 10.

In this alternative embodiment, second body member 14 includes a pair of bumps 77 on both sides of the second body member 14. In this alternative embodiment, side panels 76 of catch 16 include a pair of indentations 78 such that when catch 16 is moved from the unlatched position to the latched position in the direction indicated by an arrow F, indentations 78 substantially fit over bumps 77 to define the third locking arrangement of the clasp 10.

Referring to FIGS. 12-15, an alternative embodiment of clasp 10 is shown wherein bumps 77 are preferably located in the center of the second body member 14 such that safety catch 16 can be advantageously fastened from both top and bottom sides of the clasp 10. The catch 16, when fastened from top side of the clasp 10, can be moved from an unlatched position to a latched position in the direction indicated by an arrow-G. The catch 16, when fastened from bottom side of clasp 10, can be moved from an unlatched position to a latched position in the direction indicated by an arrow-H.

Also the magnetic 28 and 50 will be magnetically attracted to each other when aligned in the position of FIG. 9 and also when magnet 50 is rotated 180.

In these alternative embodiments, magnets 28, 50 of body members 12, 14 magnetically lock with each other to define the first locking arrangement of the clasp 10. In addition, side panels 76 embrace body members 12, 14 to define the second locking arrangement of the clasp. In these alternative embodiments, indentations 78 on catch 16, in both positions, advantageously fit over bumps 77 to define the third locking arrangement for the clasp 10.

Figure 16:
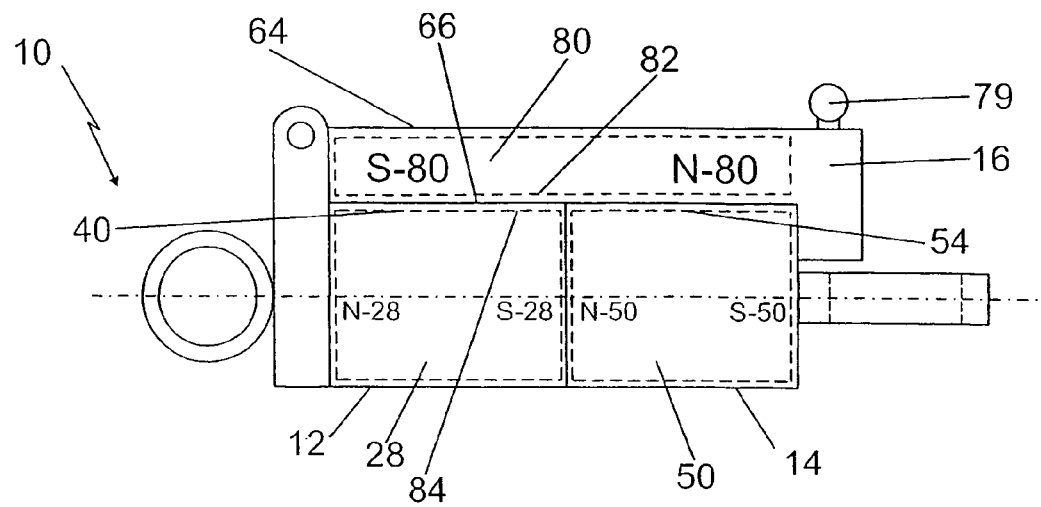
FIG. 16 is a side view of the clasp of FIG. 1 that shows an alternative embodiment of the safety catch.

Referring to FIG. 16, an alternative embodiment of clasp 10 is shown wherein the catch 16 includes a protrusion 79 that can be located on top surface 64 or end surface of catch 16. Protrusion 79 can be ball shaped, as in FIG. 16 or curved upward, as in other diagrams and can be comfortably pushed down or raised up by the user to close or open the safety catch. In this alternative embodiment, catch 16 includes a magnet 80 that is positioned within top surface 64 and bottom surface 66 of the catch 16. Magnet 80 is a bipolar magnet has a north pole N-80 and a south pole S-80 that define a magnetic surface 82. In this alternative embodiment, top surface 40 of first body member 12 and top surface 54 of second body member 14 define a magnetic surface 84. The magnetic surface 82 magnetically attracts magnetic surface 84 so as to define an automatic locking arrangement between the catch 16 and body members 12, 14 that locks automatically when the safety catch is released by the user. Protrusion 79 is preferably adapted to unlock catch 16 from clasp 10. Protrusion 72 is an additional mechanism to help hold bodies 12 and 14 together. The bi-polar magnet on the underside 71 of the safety catch arm 16 with the poles arranged so that S-80 attracts magnet 28 and N-80 attracts magnet 50.

Figure 17:
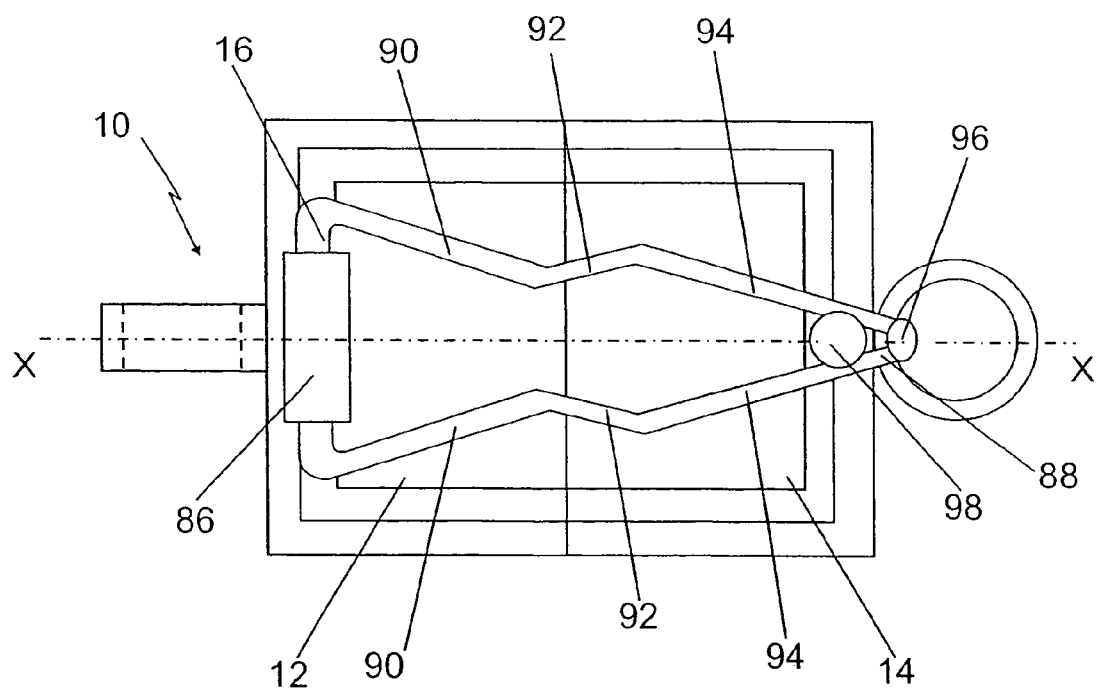
FIG. 17 is a top view of the clasp of FIG. 1 that shows an alternative embodiment of the safety catch.
Figure 18:
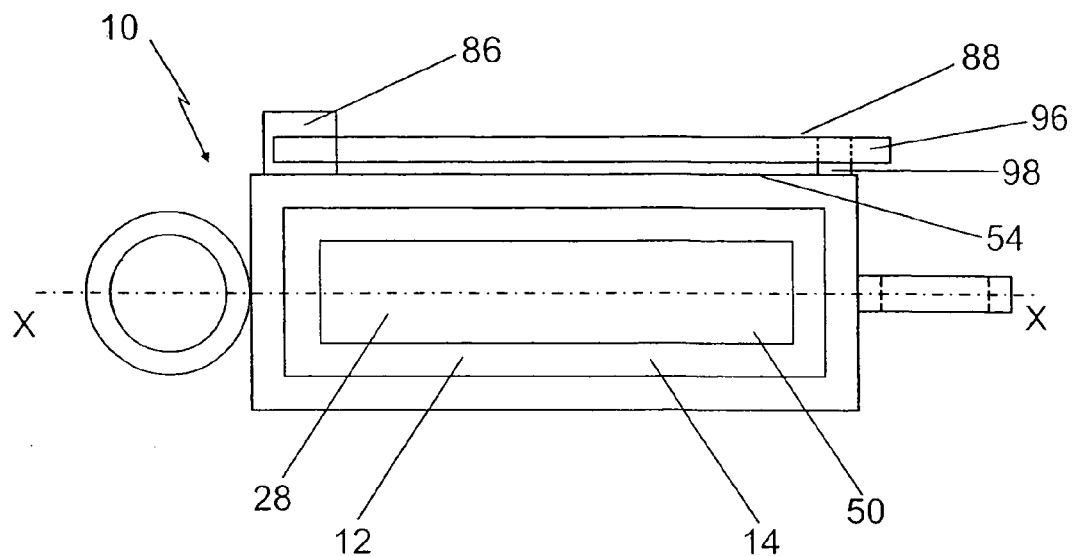
FIG. 18 is a side view of the clasp of FIG. 17.

Referring to FIGS. 17 and 18, all alternative embodiment of catch 16 is shown. In this alternative embodiment, catch 16 has a hinged end 86 and a free end 88. The hinged end 86 is preferably located on a first body member 12 and, in the locked position; a free end 88 is located on a second body member 14. In this alternative embodiment, catch 16 has a first section 90, a second section 92 and a third section 94. The first section 90 preferably inwardly constricts along the central axis-X up to the second section 92. The second section 92 preferably outwardly extends along the central axis-X up to third section 94. The third section 94 preferably inwardly constricts along the central axis-X and preferably ends into a stop 96. In this alternative embodiment, top surface 54 of second body member 14 includes a bump 98 that preferably has a height that is long enough to allow the bump 98 to get locked with catch 16.

In this alternative embodiment, magnets 28 and 50 of first and second body members 12, 14 preferably define a primary locking arrangement of clasp 10 and catch 16 preferably locks on bump 108 to define a second locking arrangement of the clasp 10. In this alternative embodiment, projection 114 has a configuration that is preferably adapted to be pushed down or pulled up with a finger to allow the user to lock or unlock the catch 16 over the clasp 10, so as to define a secondary locking arrangement of the clasp 10.

Figure 19:
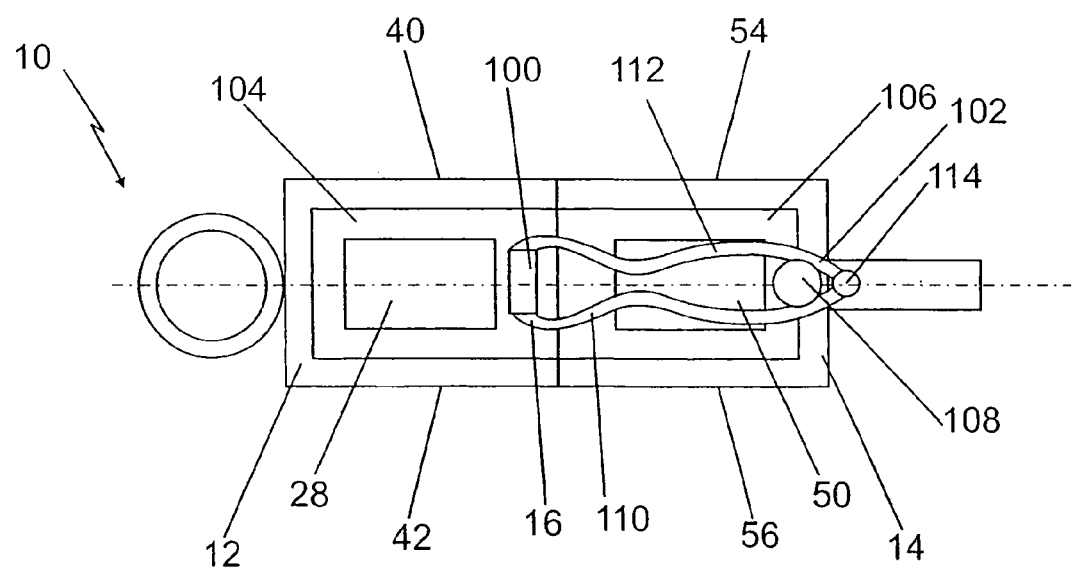
FIG. 19 is a side view of the clasp of FIG. 1 that shows an alternative embodiment of the safety catch.

Referring to FIG. 19, an alternative embodiment of catch 16 is shown. In this alternative embodiment, top surfaces 40, 54 of body members 12, 14 and the bottom surfaces 42, 56 of body members 12, 14 are plane and catch 16 is preferably located on each of the two side panels of body members 12, 14. Catch 16 has a hinged end 100 and a free end 102. The hinged end 100 is preferably located on a side panel 104 of the first body member 12 that is in proximity to open end portion 22. In this alternative embodiment, each side of second body member 14 has a bump 108 that has a ball shaped configuration that preferably extends in a plane that is substantially perpendicular to central axis-X. In this alternative embodiment, catch 16 has a first section 110 and a second section 112. The first section 110 preferably inwardly constricts along the axis-X up to second section 112. The second section 112 preferably outwardly extends from the first section 110 and tapers to end into a circular ball or projection 114.

In this alternative embodiment, magnets 28, 50 of first and second body members 12, 14 preferably define a primary locking arrangement of clasp 10 and catch 16 preferably locks on bump 108 to define a second locking arrangement of the clasp 10. In this alternative embodiment, projection 114 has a configuration that is preferably adapted to be pushed down or pulled up with finger of the user so as to permit the user to lock or unlock the catch 16 over the clasp 10.

Figure 20:
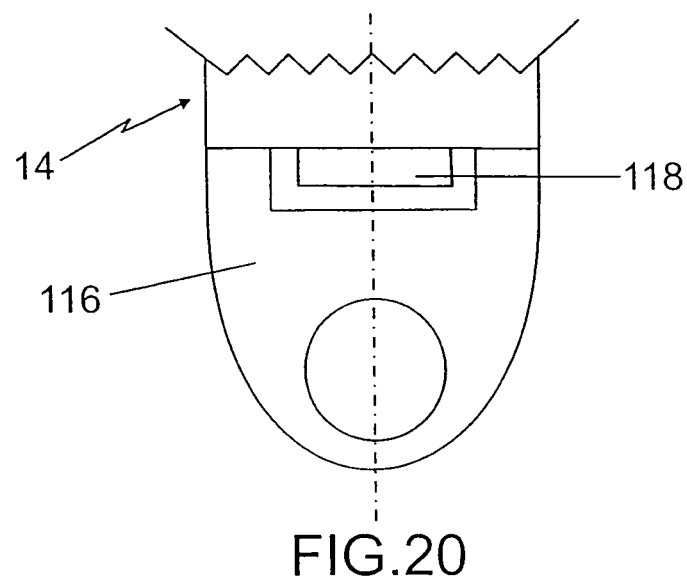
FIG. 20 is a top view of an alternative embodiment of a clasp end of the clasp of FIG. 1.
Figure 21:
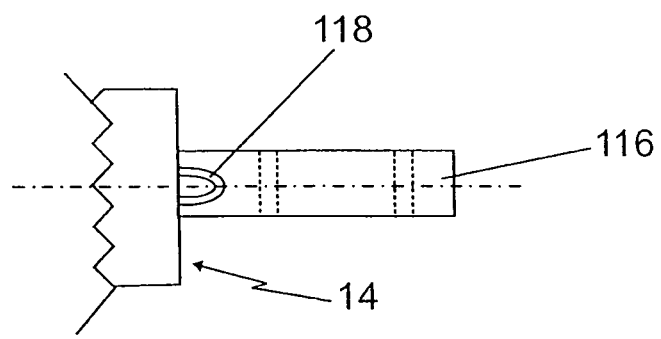
FIG. 21 is a side view of the clasp end of FIG. 20.

Referring to FIGS. 20 and 21, an alternative embodiment of clasp 10 is shown wherein second body member 14 has a clasp end 116 that includes a protrusion or a neck holding loop 118 that is preferably positioned in the center of the clasp end 116. The protrusion 118 preferably has a width that is relatively greater than its length so as to allow protrusion 118 to have a rectangular configuration. In the alternative embodiment, clasp end 116 is preferably of semicircular or oval shape, however, it is understood that the shape of the clasp end 116 may vary in other alternative embodiments.

Figure 22:
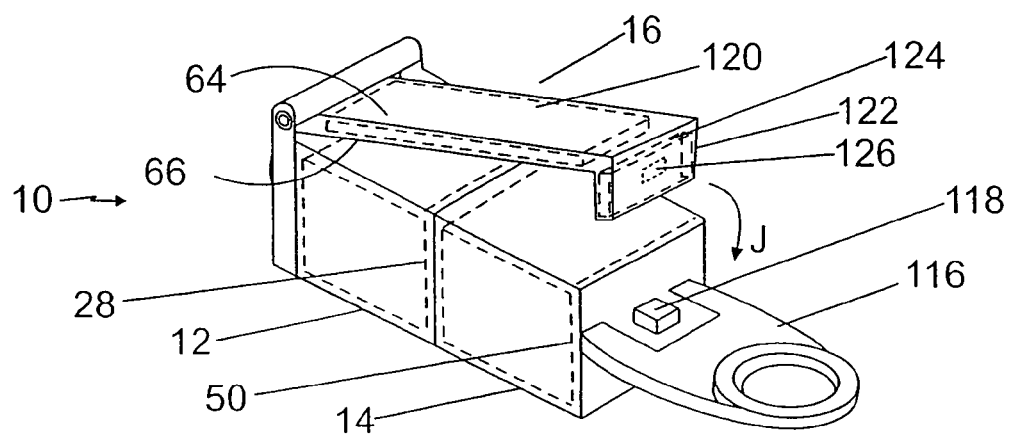
FIG. 22 is a perspective view of the clasp of FIG. 20 that shows a method of positioning of the catch to the clasp end.
Figure 23:
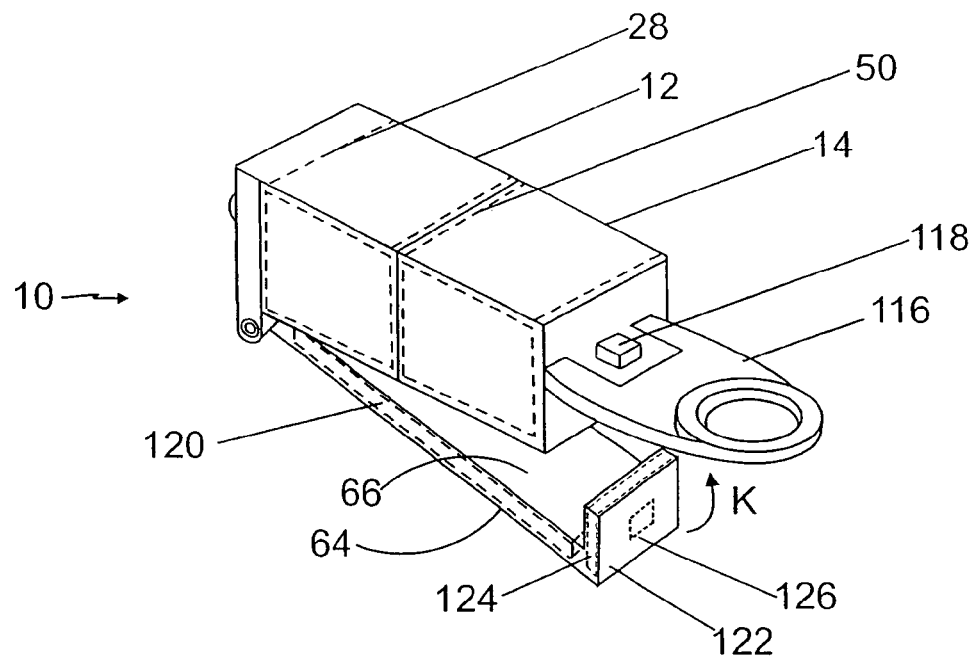
FIG. 23 is a perspective view of the clasp of FIG. 20 with an alternative position of the catch.

As shown in FIGS. 22 and 23, protrusion 118 defined in the center of clasp end 116 allow safety catch 16 to be advantageously fastened from both top and bottom sides of the clasp 10. The catch 16, when fastened from top side of the clasp 10, can be moved from an unhitched position to a latched position in the direction indicated by an arrow-J. The catch 16, when fastened from bottom side of clasp 10, can be moved from an unlatched position to a latched position in the direction indicated by an arrow-K. Catch 14, 16 can be, a magnet 120 between top and bottom surfaces 64, 66 such that the magnetic surface defined by the magnet 120 magnetically attracts the magnets 28, 50 of first and second body members 12, 14 to prevent catch 16 from being lifted unless the user does it manually. In this alternative embodiment, safety catch 16, in both positions, has a protuberance section 122 that includes a magnet 124 that magnetically attracts magnet 50 of second body member 14 to help magnet 120 in preventing lifting of catch 16 from the latched position. Catch 16, in both positions, includes an indentation 126 that has a configuration that is preferably adapted to receive protrusion 118 to define a first locking arrangement for the clasp 10. In the latched position of catch 16 magnets 120, 124 remain in strong magnetic attraction with magnets 28, 50 of body members 12, 14 that define a second locking arrangement of the clasp 10. It is understood, however, that catch 16 ma not include magnets 120, 124 in other alternative embodiments of clasp 10.

Figure 24:
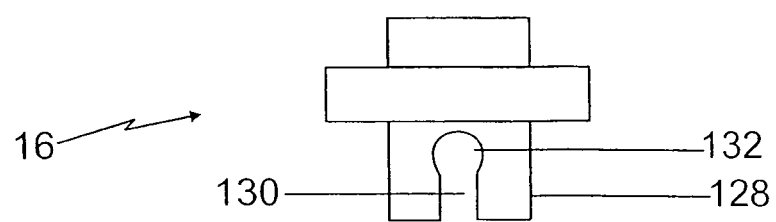
FIG. 24 is an end view of an alternative embodiment of the safety catch of the clasp of FIG. 1.
Figure 25:
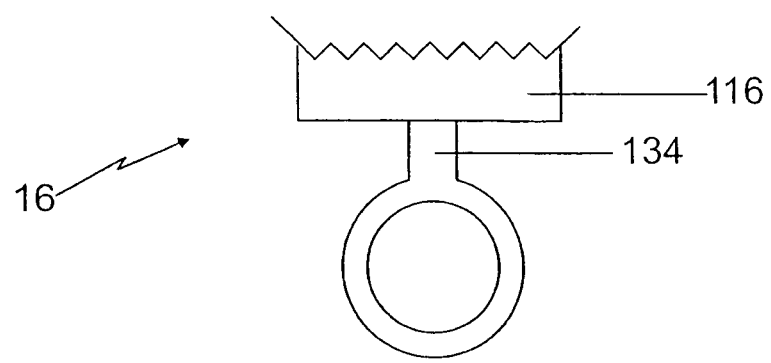
FIG. 25 is a top view of the alternative embodiment of the clasp end of the clasp of FIG. 24.

Referring to FIGS. 24 and 25, alternative embodiments for safety catch 16 and clasp end 116 of clasp 10 are shown. In these alternative embodiments, catch 16 has a protuberance 128 that is adapted to have a slit portion 130 that preferably longitudinally extends along the height of the protuberance 128. The slit portion 130, in this one alternative embodiment has a semicircular end 132 that acts as a locking mechanism for the catch 16. Clasp end 116 in this alternative embodiment includes a flange 134 that has a circular configuration that preferably has a diameter that is substantially equal to a diameter defined by semicircular end 132.

Figure 26:
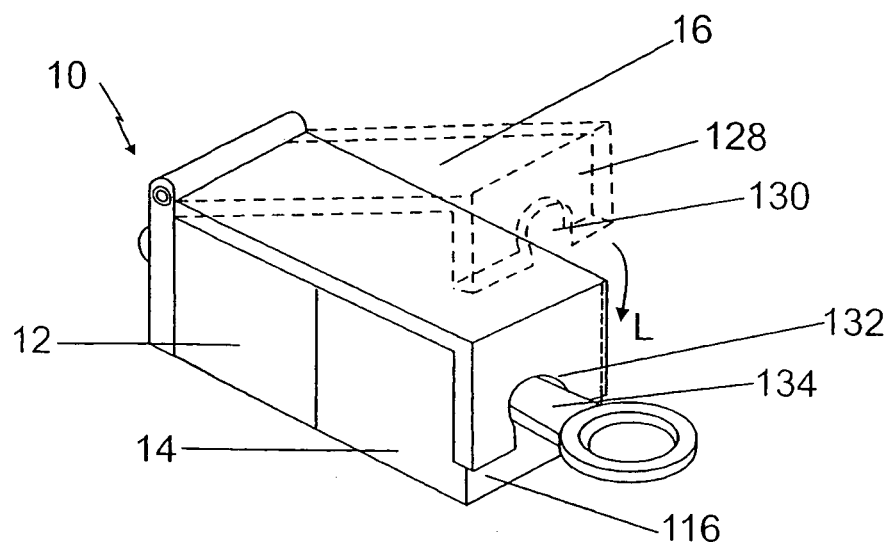
FIG. 26 is a perspective view of the clasp of FIG. 24 that shows the method of positioning of the catch to the clasp end.
Figure 27:
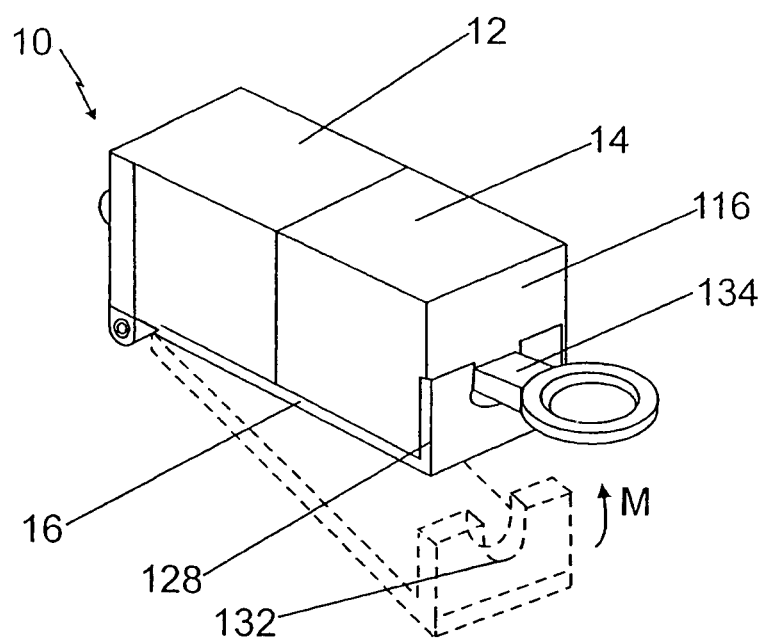
FIG. 27 is a perspective view of the clasp of FIG. 24 with an alternative method of positioning of the catch to the clasp end.

Referring to FIGS. 26 and 27, semicircular end 132 and clasp end 116 are such that safety catch 16 can be advantageously fastened to the clasp 10 from both top and bottom sides of the clasp 10. The catch 16, when fastened from top side of the clasp 10, can be moved from an unlatched position to a latched position in the direction indicated by an arrow-L. The catch 16, when fastened from bottom side of clasp 10, can be moved from an unlatched position to a latched position in the direction indicated by an arrow-M. In both the positions of catch 16, semicircular end 132 fits over flange 134 to define a first locking arrangement for the clasp 10.

It is understood, however, that catch 16 can include magnets within the protuberance 128 and longer part of the clasp in other alternative embodiments to define a second locking arrangement of clasp 10 that can prevent safety catch 16 from being lifted from the latched position and also prevent two bodies 12, 14 from being pulled apart.

The embodiments of the invention shown and discussed herein are merely illustrative of modes of application of the present invention. Reference to details in this discussion is not intended to limit the scope of the claims to these details, or to the figures used to illustrate the invention.

What is claimed is:
1. A jewelry clasp comprising:
   a first body member, the first body member having a recess for securing a first magnet, the first magnet having a north pole being positioned at a rear of the recess and a south pole being positioned at an open end of the recess;
   a second body member, the second body member having a recess for securing a second magnet, the second magnet having a south pole being positioned at a rear of the recess and a north pole being positioned at an open end of the recess, the second body member further including a protrusion protruding from a closed end of the second body member;
   a safety clasp, the safety clasp includes a free end and a hinged end, the hinged end being secured to a top portion of the first body member, the free end having a protuberance section extending downwards from the safety clasp, the protuberance section including an indentation, the safety clasp further including a third magnet positioned beneath a top surface of the safety clasp and a fourth magnet positioned within the protuberance section, the third magnet having a north pole being positioned at one end of the safety clasp and a south pole being positioned at an opposite end of the safety clasp;
   a first locking arrangement wherein the north pole of the first magnet is magnetically attracted to the south pole of the second magnet;

a second locking arrangement wherein the protrusion of the second body is received by the indentation of the safety clasp;

a third locking arrangement wherein the south pole of the third magnet is magnetically attracted north pole of the first magnet and the north pole of the third magnet is magnetically attracted south pole of the second magnet; and a fourth locking arrangement wherein the fourth magnet is magnetically attracted to the second magnet.

2. The jewelry clasp of claim 1 wherein the first body member, the second body member and safety catch are made of materials of high strength and resiliency.

3. The jewelry clasp of claim 1 wherein the safety clasp includes precious stones.

4. The jewelry clasp of claim 3 wherein the precious stones are at least one of diamonds, rubies, glass crystals, emeralds or other ornamental materials.

5. The jewelry clasp of claim 1 wherein the first body member and the second body member have their lateral distal ends respectively connected to rings.

6. The jewelry clasp of claim 1 wherein the first and second magnets are adhesively secured into recess.

7. The jewelry clasp of claim 1 wherein the first and second magnets are made of permanent magnetic material.

8. The jewelry clasp of claim 7 wherein the permanent magnetic material is Sintered Neodymium Iron Boron (NdFeB) N50.

9. The jewelry clasp of claim 1 further comprising:

a pair of side panels extending perpendicularly downwards from two sides of the safety clasp wherein the pair of side panels surround the first body member and the second body member thereby preventing misalignment of the first body member and the second body member.

10. The jewelry clasp of claim 9 wherein the second body member further includes a pair of bumps positioned on two sides of the second body member and the pair of side panels each include an indentation wherein the indentations of the side panels substantially fits over the bumps of the second body member.

11. A jewelry clasp comprising:

a first body member, the first body member having a recess for securing a first magnet, the first magnet having a south pole being positioned at a rear of the recess and a north pole being positioned at an open end of the recess;

a second body member, the second body member having a recess for securing a second magnet, the second magnet having a north pole being positioned at a rear of the recess and a south pole being positioned at an open end of the recess, the second body member further including a protrusion protruding from a closed end of the second body member;

a safety clasp, the safety clasp includes a free end and a hinged end, the hinged end being secured to a top portion of the first body member, the free end having a protuberance section extending downwards from the safety clasp, the protuberance section including an indentation, the safety clasp further including a third magnet positioned beneath a top surface of the safety clasp and a fourth magnet positioned within the protuberance section, the third magnet having a north pole being positioned at one end of the safety clasp and a south pole being positioned at an opposite end of the safety clasp;

a first locking arrangement wherein the south pole of the first magnet is magnetically attracted to the north pole of the second magnet;

a second locking arrangement wherein the protrusion of the second body is received by the indentation of the safety clasp;

a third locking arrangement wherein the north pole of the third magnet is magnetically attracted south pole of the first magnet and the south pole of the third magnet is magnetically attracted north pole of the second magnet; and a fourth locking arrangement wherein the fourth magnet is magnetically attracted to the second magnet.

12. The jewelry clasp of claim 11 wherein the first body member, the second body member and safety catch are made of materials of high strength and resiliency.

13. The jewelry clasp of claim 11 wherein the safety clasp includes precious stones.

14. The jewelry clasp of claim 13 wherein the precious stones are at least one of diamonds, rubies, glass crystals, emeralds or other ornamental materials.

15. The jewelry clasp of claim 11 wherein the first body member and the second body member have their lateral distal ends respectively connected to rings.

16. The jewelry clasp of claim 11 wherein the first and second magnets are adhesively secured into recess.

17. The jewelry clasp of claim 11 wherein the first and second magnets are made of permanent magnetic material.

18. The jewelry clasp of claim 17 wherein the permanent magnetic material is Sintered Neodymium Iron Boron (NdFeB) N50.

19. The jewelry clasp of claim 11 further comprising:

a pair of side panels extending perpendicularly downwards from two sides of the safety clasp wherein the pair of side panels surround the first body member and the second body member thereby preventing misalignment of the first body member and the second body member.

20. The jewelry clasp of claim 19 wherein the second body member further includes a pair of bumps positioned on two sides of the second body member and the pair of side panels each include an indentation wherein the indentations of the side panels substantially fits over the bumps of the second body member.

* * * * *